Feb. 15, 1966 J. W. RYAN 3,234,686
REMOTE CONTROL APPARATUS FOR TALKING DOLL
Filed Feb. 8, 1963 4 Sheets-Sheet 1
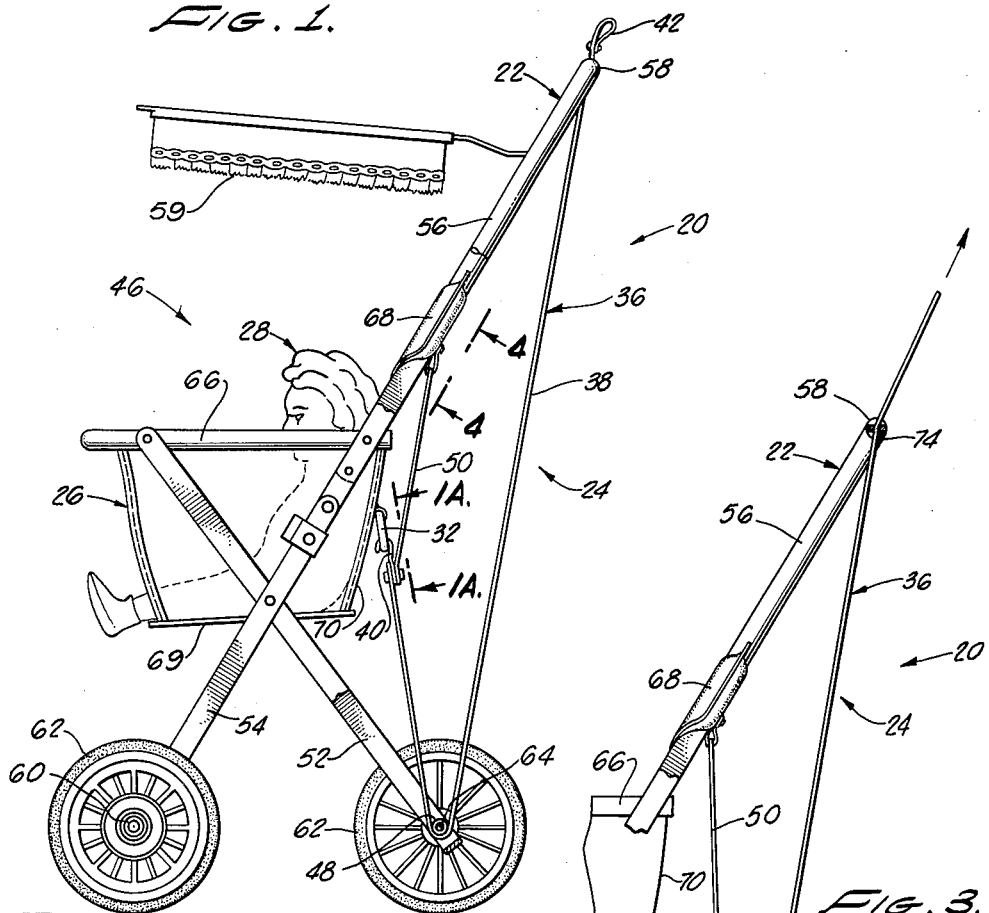
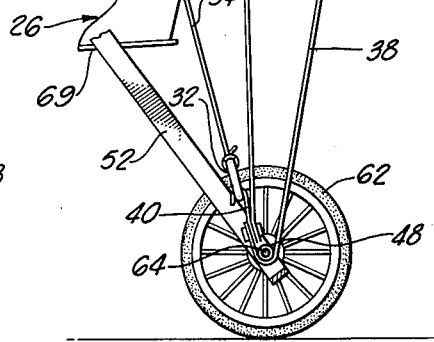
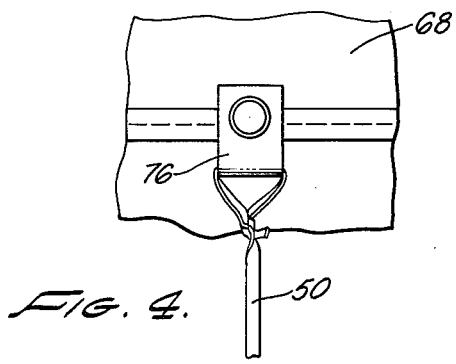
INVENTOR.
JOHN W. RYAN
BY Albert M. Herzig
ATTORNEY Feb. 15, 1966          J. W. RYAN          3,234,686
REMOTE CONTROL APPARATUS FOR TALKING DOLL
Filed Feb. 8, 1963          4 Sheets-Sheet 2
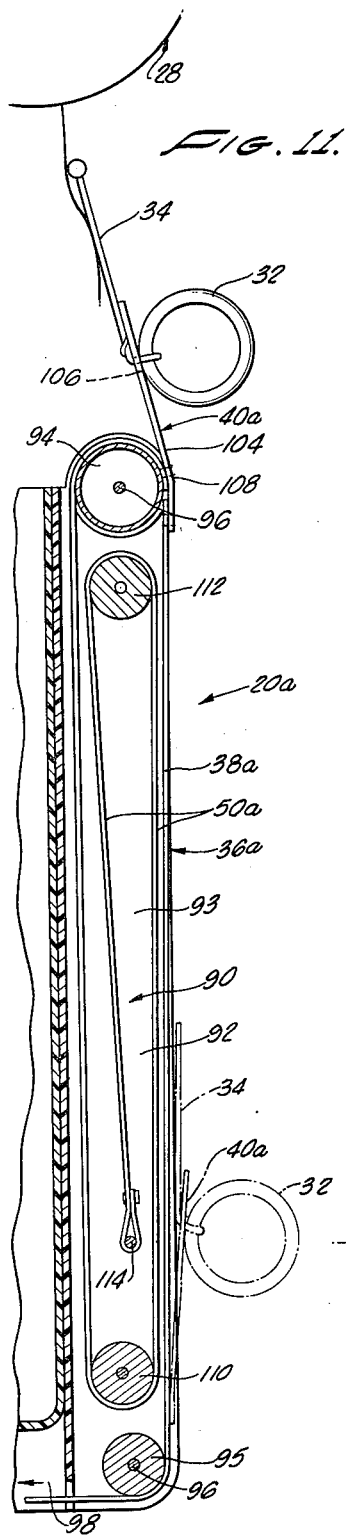
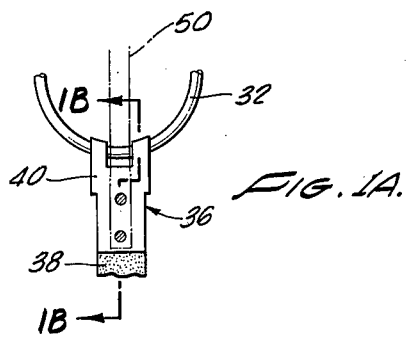
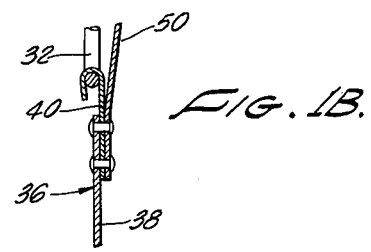
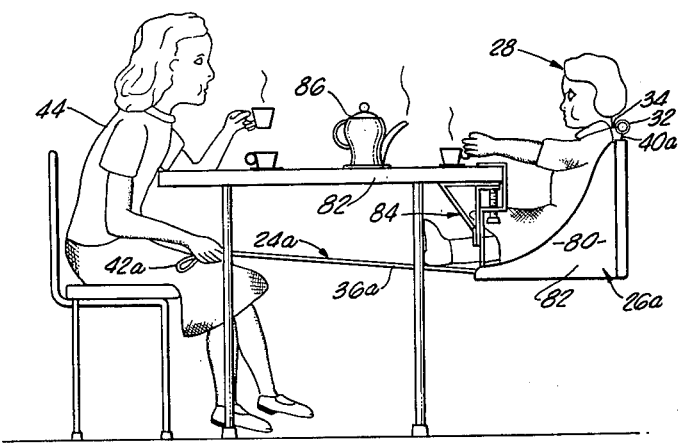
INVENTOR.
JOHN W. RYAN
BY Albert M. Herzig
ATTORNEY

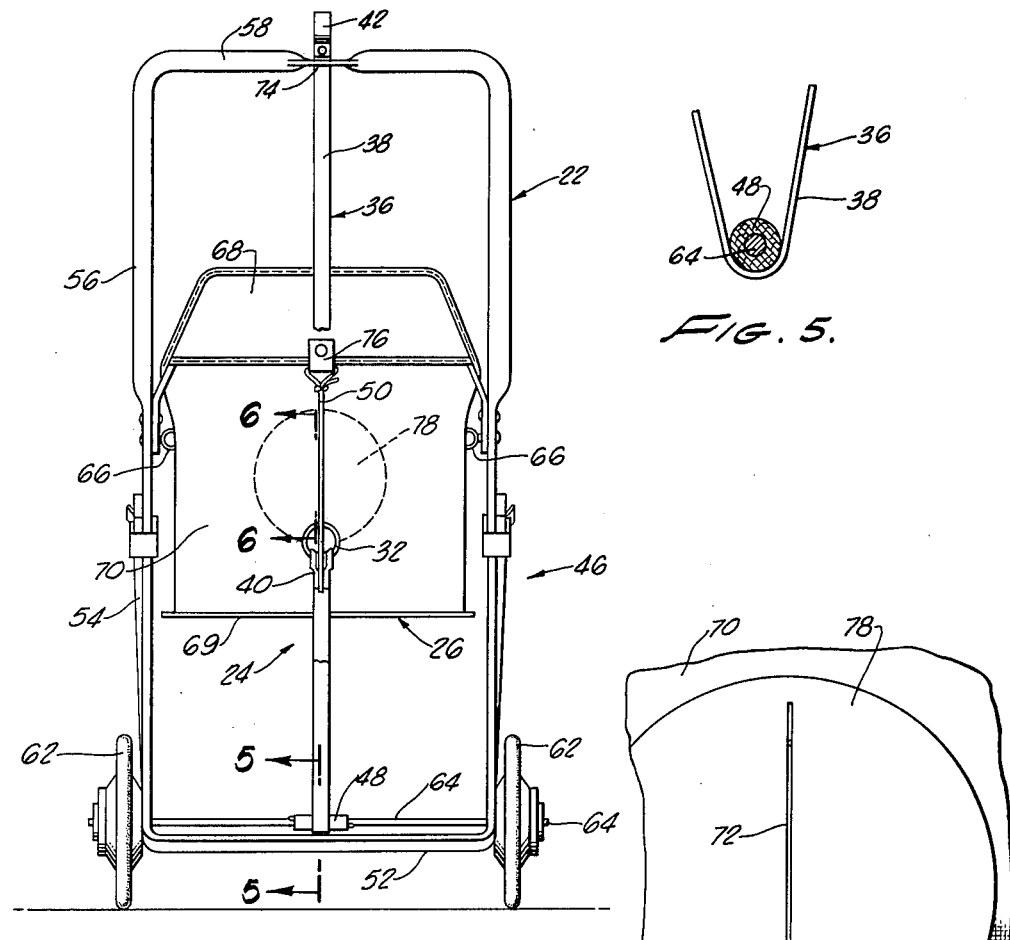
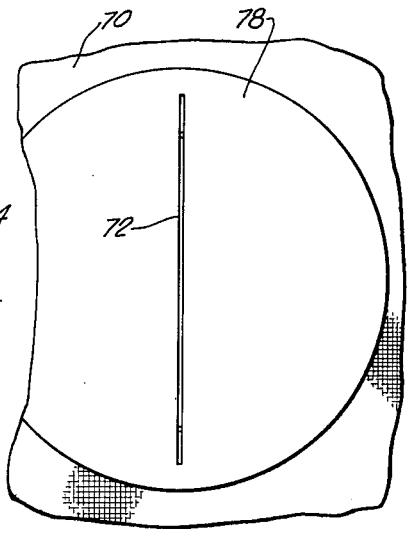
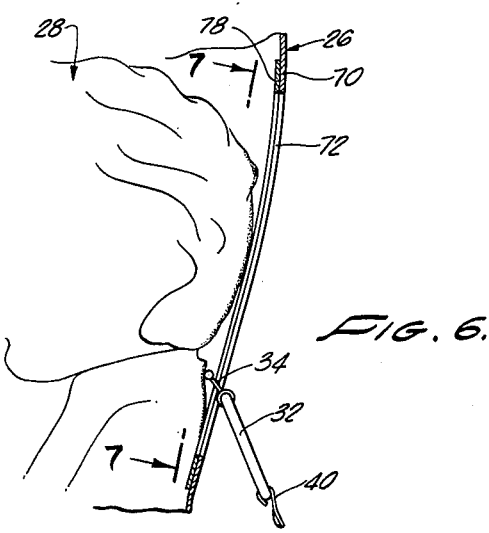

Feb. 15, 1966     J. W. RYAN     3,234,686
REMOTE CONTROL APPARATUS FOR TALKING DOLL
Filed Feb. 8, 1963     4 Sheets-Sheet 4
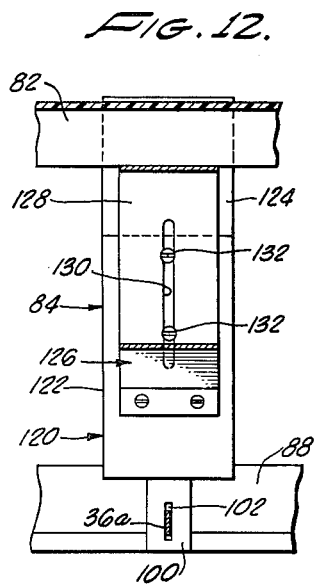
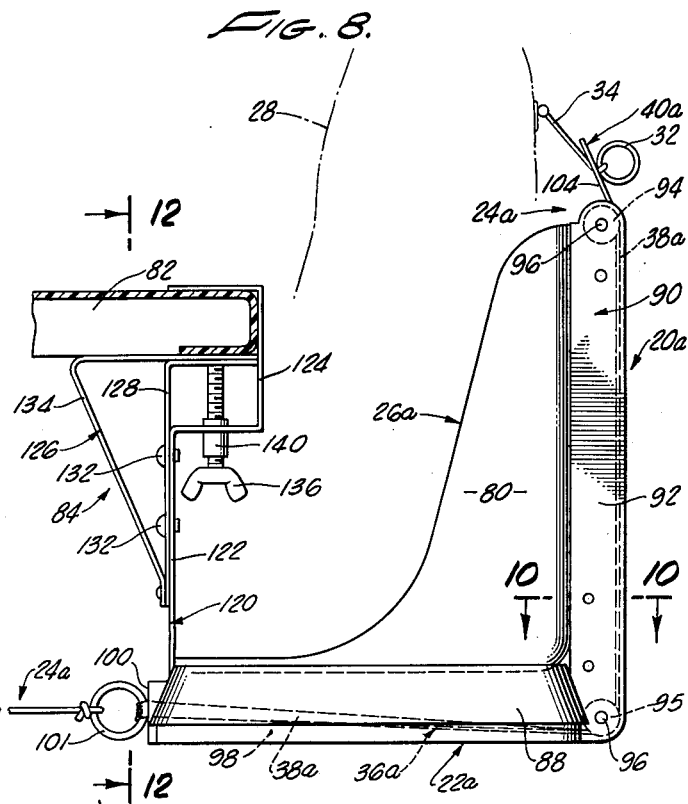
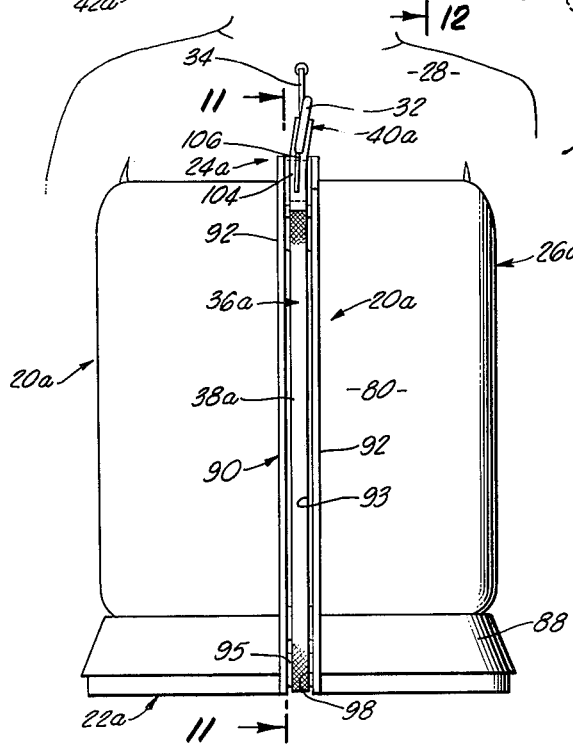
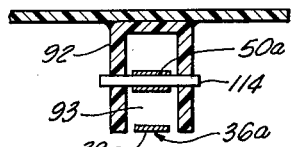
INVENTOR.
JOHN W. RYAN
BY Albert M. Herzig
ATTORNEY United States Patent Office 3,234,686
Patented Feb. 15, 1966

3,234,686
REMOTE CONTROL APPARATUS FOR
TALKING DOLL
John W. Ryan, Bel Air, Calif., assignor to Mattel, Inc.,
Hawthorne, Calif., a corporation of California
Filed Feb. 8, 1963, Ser. No. 257,166
6 Claims. (Cl. 46—99)

The present invention relates generally to control apparatus for use with children's toys, and more particularly to such control apparatus for permitting a child to operate the speech producing mechanism of a "talking" doll.

Children have a great love and fondness for "playmates" whether they be other small children, puppies or even inanimate objects. In particular, various dolls have been devised which will act in various different respects like a live human being for a child. That is, they will "do things" on their own, requiring, to greater or lesser extent, minimum direction, control or manipulation by the child. Of course the less obvious and direct control by the child the more enjoyable the play experience as the child derives the sensation or experience that he is playing with someone and there is in effect an interchange or element of give and take.

A talking doll of the type having a phonograph speech unit or mechanism whereby the doll may be operated to produce various sounds randomly selected is disclosed quite fully in Patent No. 3,017,187 issued to applicant on January 16, 1962. Very briefly, the phonograph or voice or speech unit or mechanism is contained within the doll. These units operate on a pull-return type mechanism which is operated by a string or cord extending out from the back of the doll and adapted to be pulled by the child-user. The end of the cord is pulled and then released which results in the playing of a speech by the phonograph speech unit within the doll. Generally, the pulling of the cord serves to tighten or tension a spring motor within the phonograph unit and when the cord is released the spring motor causes the record and the needle to move relative to one another whereby a sound sequence is emitted by the unit.

The outer end of the cord may be provided with a movable part such as a ring or loop to facilitate the pulling of the cord. Normally, the ring, prior to being pulled, is located close to the body of the doll, and the doll is ordinarily operated by holding or grasping it in one hand while the other hand grasps the ring and pulls outwardly to actuate the speech unit. This arrangement, while suitable for many play situations, requires that the doll be held in close proximity to the child-user and further occupies both of her hands to operate the talking doll.

Accordingly, it is a prime object of the present invention to provide a novel and improved control apparatus which permits the child to operate her talking doll from a posiiton remote from the doll itself.

It is a further prime object of the present invention to provide a novel and improved control apparatus whereby the speech producing unit for the talking doll may be operated by only one hand of the child-user, rather than both hands as has previously been required.

It is a further object of the present invention to free one hand of the child-user to facilitate her engagement in a conversational or vocal play situation with the talking doll through the use of associated play apparatus or toys which may be manipulated by her free hand in conjunction with the conversations.

Another object of the present invention is the provision of remote control apparatus which is readily engageable and disengageable from the doll.

It is a further object to provide a novel and improved control apparatus which includes seat or support means that facilitates the operation of the apparatus.

It is also an object to provide a remote control apparatus for use with a pull-return type speech unit, the remote control apparatus being constructed and arranged to minimize undesirable interference with the play of the record of the speech unit. In this regard it is also a more particular object to reduce frictional resistance in such an apparatus. A further specific object in this respect is the provision of a counteraction or balancing means for negating frictional forces in such an apparatus.

It is a further object to provide a remote control apparatus which is so constructed and arranged that its operation is somewhat concealed and unobvious which tends to intensify the feeling of "remoteness" imparted to the child-user when she uses the apparatus.

It is a further object of the present invention to provide an improved remote control apparatus which is sturdy and durable, while being economical to manufacture and maintain. Another object of this invention comprehends the provision of a figurine such as a doll provided with new and improved means to foster and carry out a wide variety of play situations by a child in combination with said speaking figurine of the devised character referred to.

Various other objects and advantages of the present invention will become obvious from the following description and from the drawings, wherein:

FIGURE 1 is a side-view (with parts broken away) of a preferred form of doll stroller embodying an illustrative control apparatus of the present invention and showing a talking doll seated in the stroller, the control apparatus being in engagement with the doll but being in its relaxed position;

FIGURE 1A is a rear view generally along line 1A—1A of FIGURE 1;

FIGURE 1B is a sectional view taken generally along line 1B—1B of FIGURE 1A;

FIGURE 2 is a rear view of the stroller shown in FIGURE 1;

FIGURE 3 is a side view, generally similar to FIGURE 2, but of only a portion of the stroller and showing the control apparatus in its extended position;

FIGURE 4 is a view taken generally along line 4—4 of FIGURE 1;

FIGURE 5 is a sectional view taken generally along line 5—5 of FIGURE 2, showing the friction reducing means of the illustrated structure;

FIGURE 6 is a sectional view taken generally along line 6—6 of FIGURE 2, illustrating the vertical slot in the rear wall of the stroller seat;

FIGURE 7 is a view taken generally along line 7—7 of FIGURE 6;

FIGURE 8 is a side view of a doll seat that is secured to the edge of a table and is a modified embodiment further illustrative of the invention;

FIGURE 9 is a rear view of the doll seat shown in FIGURE 8;

FIGURE 10 is a sectional view taken generally along line 10—10 of FIGURE 8;

FIGURE 11 is a side sectional view taken generally along line 11—11 of FIGURE 9;

FIGURE 12 is a view of the support bracket for the doll seat taken generally along line 12—12 of FIGURE 8; and FIGURE 13 is a perspective view showing the doll seat of FIGURES 8 through 12 (with a doll seated in it) secured to a table across from a child who is actuating the speech unit of the doll with one hand while using the other hand to manipulate the associated play apparatus in play with the doll.

Generally, the remote control apparatus 20 illustrated in FIGURES 1 through 7 comprises a frame 22 and remote control means 24. Frame 22 includes seat or support means 26 adapted to receive and support in a desired position a talking doll 28 of the type described above, having a voice or speech unit with a movable part 32 for actuating the speech unit. The illustrated seat means 26 serves to maintain the doll 28 in a generally fixed position while the movable part 32 is moved.

The illustrated remote control means 24 includes a movable element 36 made up of an elongated part 38, connection means 40 at one end of the elongated part 38 for releasably connecting the elongated part to the movable part 32 of the speech unit, and handle means 42 at the other end of the elongated part for grasping by the child-user 44 with one of her hands. The handle means 42 is disposed a substantial distance from the doll 28 to tend to create the illusion that the doll is speaking by itself and without being directly controlled.

The preferred embodiment of the apparatus 20 is incorporated into a wheeled doll stroller 46 as shown in FIGURES 1 through 7. By pulling on the handle means 42, located at the push handle of the stroller, the child 44 may converse with the doll 28 while the stroller is standing still or being wheeled about. Since the handle means 42 may be operated with one hand, the child is free to wheel the stroller about while "talking" to the doll.

This doll stroller 46 is particularly adapted for use with talking dolls having the pull-return, spring operated phonograph speech units as described generally above. In such a speech unit, as stated above, a spring motor (not shown) is wound or tensioned during the pulling of a cord 34 and the spring then unwinds or untensions to cause play of the phonograph record (not shown). Thus, it is important that the cord 34 and spring not be burdened or interfered with as the record is played or the play will be affected and the sound distorted. To minimize interference, the movement of the element 36 is facilitated by the insertion between it and the frame 22 of low friction or friction reducing means 48. To further reduce interference, the illustrated structure is provided with counteraction or balancing means 50 which tends to offset frictional resistance to the return movement of the cord 34.

Now the preferred embodiment shown in FIGURES 1 through 7 will be considered in further detail.

The illustrated doll stroller 46, seen best in FIGURES 1 and 2, is of a generally crossed or X configuration at either side of the stroller, with the seat or support means 26 supported on an open framework of interconnected beam or rod members which can be moved relative to one another to collapse or fold up the stroller for storage. More particularly, an upwardly extending lower U-shaped member 52 is pivotally connected intermediate the length of its legs to comparable locations on the legs of a second upwardly extending lower U-shaped member 54. The lower members 52 and 54, thus, form an X or cross at either side of the doll stroller 46. The upwardly extending legs of the lower member 54 are connected through a linkage to the downwardly extending legs of an upper U-shaped member 56. The transversely extending portion of the upper U-shaped member 56 constitutes a push bar 58 for moving the stroller forwardly. FIGURE 1 illustrates a decorative canopy 59 which may be secured to the upper U-shaped member 56 in a generally horizontal position over the seat means 26.

A forward wheel axle 60 is journalled in a generally horizontal position through suitable bearing apertures located adjacent the lower ends of the legs of the lower U-shaped member 54. A wheel 62 is secured to each end of forward axle 60 outwardly of the member 54. A rear axle 64 is journalled in like bearing apertures in the lower U-shaped member 52 (FIGURE 2), and a wheel 62 is secured to either end of rear axle 64 outwardly of the member 52.

The illustrated seat or support member 26 is a generally rectangular structure which is open at the top and front, and is provided with a pair of side walls, a bottom wall or seat 69 and a relatively higher rear wall 70. The bottom wall or seat 69 may be a solid plate of a material such as sheet metal or plywood, but it is desirable that the side and rear walls be of flexible, pliable material such as cloth, canvas, or sheet plastic material to facilitate folding the stroller for storage or when it is not being used.

The seat or support means 26 is supported on a horizontally disposed, generally U-shaped member 66 which is supported in position by being secured to the legs of lower member 52 and upper member 56 adjacent their ends. This supporting construction may be best seen in FIGURE 1. As shown in FIGURE 2, the seat or support means 26 is further supported by a generally transversely extending back rest member 68, which is secured at either end between the legs of upper member 56.

As seen best in FIGURES 1 and 6, the doll 28 may desirably be seated in the seat or support means 26 in a seated position with its back generally rested against the rear wall 70 of the seat means 26. As noted above, in a number of the pull-release type talking dolls, the movable part of the speech unit is a ring or loop which is secured to the outer end of the cord. To accommodate such a ring or loop 32, the rear wall 70 of the seat or support means 26 is provided with a vertical slot (seen best in FIGURES 6 and 7). When the doll 28 is put into the seat means 26, the ring or loop readily passes through the vertical centered access slot 72 into position to engage the connection means 40. The illustrated connection means 40 of this embodiment is a hook or curved finger which releasably hooks or engages the ring or loop 32, as seen best in FIGURES 1A and 1B.

The elongated part 38 of this illustrated structure is a long flat strip, strap or strand which is secured at one end to the connection hook 40. The strand 38 from its point of connection with the ring 32, passes down under the rear axle 64 and then up to the push bar 58. The friction reducing means 48 of this structure is a hollow cylinder preferably made of wood or a comparable material and disposed for free turning on rear axle 64. The elongated strand 38 passes around the cylinder 48 (as shown in FIGURE 5), which is kept in a generally central position on the axle 64 by a pair of projections on the axle which restrict the movement of the cylinder in either direction. A minimum of friction or resistance is produced between the revolving wooden cylinder and the axle 64 which is preferably constructed of some hard substance such as metal.

The other end of the strand or strap 38 passes through a slot or aperture 74 in the center of the push bar 58. This end of the strap 38 is secured in a loop (as by means of a rivet), and this loop forms the handle means 42 for the illustrated structure. This handle means 42 may be grasped and manipulated by the child-user of the apparatus, as explained more fully below, and it further prevents the end of the strap 38 from being pulled down through the slot 74.

The balancing or counteraction means 50 is provided in the illustrated structure by an elongated, flexible, resilient band or strip. This band 50 is secured at one of its ends to about the center of the transverse member 68 and at the other end to the end of the elongated strap 38 adjacent the connection means 40. One convenient way of securing the band 50 to the transverse member, 68, as illustrated in FIGURE 4, is to fix a loop 76 to the member 68, as by means of a rivet, and tie the flexible, resilient band 50 to the loop 76. Other means of securement may likewise be used.

As seen best in FIGURES 6 and 7, the elongated, vertical center access slot 72 extends for a substantial distance down the rear wall 70. This length permits the stroller 46 to be used with different size dolls, as well as to be used with dolls disposed in different positions. The length of the slot 72 further permits freer movement of the cord 34 incident to its being pulled and released and reduces interference to its movement. It also tends to minimize localized strain or pressure which might be created on the rear wall 70 of the seat or support means 26. The rear wall 70 of the illustrated stroller is reinforced as seen best in FIGURE 7 by a disc or circular sheet 78, which is secured to the forward surface of the rear wall 70. Disc 78 has a slot which coincides with the slot in the rear wall 70 to provide the access slot 72.

The illustrated elongated strap 38 is preferably of a high friction material such as plastic or leather, so that movement of the strap 38 carries with it the wooden cylinder 48 which revolves freely about the rear axle 64. In this way, frictional forces tending to restrain the movement of the strap 38 are minimized.

The operation of the illustrated doll stroller 46 and control apparatus 20 should now be apparent. The talking doll 28 is placed in the seat means 26, and the ring 32 at the back of the doll is inserted through the access slot 72 and engaged with the connection hook 40. The connection hook 40 is maintained in approximately the proper position for such engagement by the flexible, resilient band 50. Now the child-user may cause the talking doll 28 to speak to her while she is standing still or wheeling the doll around in the doll stroller. By merely pulling the handle means 42 with one hand and then releasing it, the doll may be made to talk. The other hand is free to wheel the stroller 46 or to accomplish other functions. It may also be noted that the pull on the ring 32 (through the movable element 36) urges the doll against the seat means 26. Further pulling of the cord winds or tensions the spring motor of the speech unit. Thus, this holding function which was heretofore normally accomplished by the other hand of the child-user is performed by the seat means and the other parts of the illustrated apparatus.

FIGURES 8 through 13 illustrate a modified form of remote control apparatus, which modification is designated 20a. Remote control apparatus 20a is embodied in an illustrative doll table seat 80 which is adapted to be secured to the side of a table 82 so that the child may sit at the table and play with the doll 28.

Generally, in this illustrated control apparatus 20a a frame 22a includes a support or seat means 26a having attachment means 84 which releasably secure the seat means 26a to the table 82. Remote control means 24a for operating the speech unit of the doll 28 includes a movable element 36a. The illustrated movable element 36a of this embodiment includes an elongated part in the form of a strand for cord 38a which is connected at one end to connection means 40a for releasably connecting the movable element 36a to the speech unit of the doll 28, and at the other end with a handle means 42a for grasping by the child-user to actuate the doll speech unit. The illustrated remote control means 24a further includes counter-balanced or compensating means 50a which tends to minimize disturbing or interfering forces acting against the proper play of the speech unit.

FIGURE 13 illustrates the doll 28 seated in the table seat 80 with the child-user 44 seated across the table at a removed or remote position. Associated play apparatus or toys 86, in this case a tea set, are shown upon the table for use by the child in playing with the doll. Inasmuch as the illustrated apparatus permits the child to operate the speech unit of the doll with one hand, the other hand is free to manipulate the associated toys 86 and thereby "play with" the doll as would not ordinarily be possible if it were necessary for her to hold the doll with one hand. In this particular case, the child is having tea with the doll and conversing with it while also manipulating the tea set 86.

By virtue of this apparatus, a child or group of children and/or adults may create new and absorbing play situations such as card games, wherein e.g., the doll's speech unit calls out its cards or plays, preferably, though not necessarily, in a random fashion; a tea or other party wherein e.g., the child can respond to the doll's request for "tea," "sugar," "stir my soup please," "feed me please," "I'm through," "may we go for a walk," and so on; or in a game such as checkers, Monopoly or the like, the doll or other figurine can call out its desired moves which are then made on its behalf by the child. Further, for example, the doll might serve as a referee between two or more children playing together at any desired game. Various other play situations may be enacted in a similar manner utilizing appropriate associated toys, apparatus or equipment which may also possibly correspond to different doll clothes for the talking doll or costumes for the child.

Now to consider the illustrated table seat 80 in further detail, the illustrated seat means 26a is formed to provide a bottom wall and a rear wall which is turned forward at its sides to provide short sidewalls. The seat means 26a rests upon a base section 88 of the frame 22a.

The illustrated support and guide means 90 for the movable element 36a extend down the rear center of the seat means 26a and forwardly along the underside of the base section 88. More specifically, the portion of the guide means 90 on the rear of the seat is comprised of an elongated vertically extending channel section 92 which is secured to the center rear of the rear wall of the seat means. The channel section 92 opens rearwardly to provide a vertically extending channel or groove 93. A pair of rollers are mounted in the groove 93 of channel section 92 for free rotation about horizontally extending pins or rods 96 which are secured to the channel section 92. One roller 94 is positioned at the upper end of the channel section 92 while the other or lower roller 95 is positioned adjacent the lower end of that section. The groove 93 of the channel section 92 is adapted to receive the movable element 36a, and particularly the elongated strand 38a, and the rollers 94 and 95 provide low friction rolling support for that movable element 36a.

The portion of the support and guide means 90 along the underside of the base section 88 is provided in the illustrated apparatus by an elongated groove 98 in that base section and extending from front to rear approximately in the center of the base section. At the forward end of the groove 98 there is provided a vertical plate 100 which has a aperture 102 for receiving the elongated strand 38a of the movable element 36a (FIGURES 8 and 12).

The illustrated elongated strand 38a is comprised of two parts which are connected together at a point generally forwardly of the small plate 100. This connection is provided by an enlarged loop 101 to which the adjacent ends of the two parts of strand 38a are secured. The enlarged loop 101 also acts as a stop to limit the rearward movement of the movable element 36a as will be more fully understood after the completion of the description. The forward part of strand 38a is sufficiently long to position its forward end (at which the handle means 42a is located) at a reasonably distant point from the doll itself. For example, FIGURE 13 illustrates the positioning of the doll 28 at one side of the table with a child-user 44 seated across from the doll on the other side of the table while grasping the forward-most end of the movable element 36a.

The connection means 40a of the illustrated structure is secured to one end of the elongated strand 38a and is normally positioned, as shown in FIGURES 8 and 11, at a convenient point to be engaged with the ring 32 and cord 34 of the doll 28 when the doll is seated in the seating or support means 26a. This positioning of the connection means 40a is accomplished by the action of the balancing means 50a as will be described below.

The illustrated connection means 40a comprises a short rectangular strip 104 with a vertically disposed longitudinal slot or aperture 106 that is adapted to receive the ring 32 of the doll. By properly manipulating the doll or pulling outwardly slightly on the ring 32 and cord 34, the ring 32 of the doll's speech unit may be inserted in the slot 106. The ring 32 and cord 34 will normally maintain themselves in interlocking relation with the strip 104, although the ring may be readily disconnected when desired from the connecting means 40a by merely reinserting it through the slot 106. For example, to provide a connection, the ring 32 may be rotated somewhat so that the plane which it defines is out of alignment with the elongated slot 106. Also, and particularly if the cord 34 has been pulled somewhat to create a tension on the ring 32 tending to pull it back toward the doll, the ring 32 need not be turned but the mere tension upon the cord 34 will tend to create a wedging or interlocking action between the ring 32 and cord 34 on the one hand and the upper end of the aperture 106 on the other hand.

Thus, it may be seen that by pulling on the handle means 42a from a remote position, the ring 32 and cord 34 of the speech unit are moved to the position generally as shown in phantom in FIGURE 11. Then when the handle means 42a is released, the speech unit will operate to play the record.

The balancing or counteraction means 50a of the illustrated structure which serves to minimize interference with the free return of the ring 32 and cord 34 incident to the playing of the record of the speech unit, is comprised of an elongated strand of flexible, resilient material. As seen best in FIGURE 11, one end of this strand 50a is secured to the movable element 36a at the connection means 40a at a point designated 108. The flexible, resilient strand 50a is then wound over the upper roller 94 and from there down inside the groove 93 of the channel section 92 and around a roller 110 which is pivotally mounted in the lower portion of the channel section 92. The strand 50a then extends upwardly and over another roller 112 which is pivotally mounted in the upper part of the channel 92, although below the upper roller 94. Finally, the strand 50a passes back down within the groove 93 and is secured to a transverse pin 114 located in the lower part of the groove 93 (FIGURE 10). The construction just described permits the use of a strand 50a which has a length well over twice the height of the doll table seat 80. Using this length of strand 50a means that there is less elongation per unit of original length incident to the operation of the apparatus. This tends to prolong the life of the flexible, resilient strand 50a, and further provides a resilient pull or bias of the nature and quantity desired for this apparatus.

The illustrated attachment means 84, as shown best in FIGURES 8 and 12, includes a base plate 120 having a vertically disposed section 122 which is secured at its lower end to base section 88 of the frame 22a. The base plate 120 also has an upper section 124 which is formed into a forwardly open U-shaped section which receives the edge of the table 82. In particular, when the table seat 80 is secured to the table 82, the upper leg of the U-shaped section 124 rests upon the upper surface of the table top edge.

The base plate 120 is maintained in attached relation to the table by means of an adjustment clamping means 126 which includes an L-shaped part 128. More specifically, one vertically disposed leg of the L-shaped part 128 is secured to vertical section 122 of base plate 120 by virtue of a longitudinal, vertically disposed slot 130 in that vertical leg of section 128. This slot 130 receives in sliding engagement a pair of pins 132 that are secured to the adjacent vertical section 122. The pins 132 are provided with enlarged heads which permits the L-shaped plate 128 to slide up and down relative to base plate 120 to the extent the slot 130 permits. The other leg of the L-shaped plate is turned inwardly or rearwardly into the U-shaped section 124 and is disposed generally horizontally and parallel with the upper leg of that U-shaped section 124. A V-shaped plate 134 is secured to the L-shaped plate 128 and moves together with it as part of the adjustment clamping means 126. One leg of the V-shaped plate 134 is secured at the lower edge of the vertically disposed leg of the L-shaped plate 128, while the other leg of the V-shaped plate 134 overlies the other or horizontally extending leg of the L-shaped plate 128. This overlying leg of the V-shaped plate 134 is thus positioned to engage the underside of the table edge, as shown best in FIGURE 8, when the apparatus is secured to the table.

Relative movement between the base plate 120 and adjustment clamping means 126 is provided by a wing head screw or bolt 136 which is threaded through a bushing 140 fixed in the lower leg of the U-shaped section 124 of the blase plate 120. The screw 136 is thus disposed in a vertical direction with its upper end positioned to engage the underside of the turned in or horizontal leg of the L-shaped plate 128. Turning the screw 136 serves to clamp the table edge between the upper leg of the U-shaped section 124 on the one hand and the inwardly turned legs of the V-shaped plate 134 and the L-shaped plate 128 on the other hand. Thus, the doll seat 80 may be effectively and securely attached to the table 82 and then easily and readily removed from the table or moved to another position by loosening the screw 136 and retightening it when the apparatus is placed in its new location.

Thus, novel and improved structure is provided by the apparatus shown in these drawings which provides a number of desirable features or advantages. Of prime importance, this apparatus permits the child-user to operate the speech unit of the doll from a point remote from the doll itself to create the illusion or impression that the doll is acting on its own and is not being directly controlled or operated by the child. Also of prime importance is the freeing of one hand of the child-user, which hand is normally involved in holding the doll while the other hand pulls the operating cord for the speech mechanism; this freeing of one hand of the child permits various associated play apparatus or toys to be manipulated by the child in playing with the doll and conversing with the doll with relation to this play apparatus to create many varied, interesting and stimulating play experiences for the child. Further, the illustrated structures are so constructed as to minimize any interference with the normal and desired operation of the speech units of the dolls. Various other and more specific advantages of the disclosed apparatus may of course be observed from the foregoing description and associated drawings.

Obviously various changes and modifications may be made in the disclosed and described illustrative structures without departing from the spirit and scope of the present invention. Various features of the invention are set forth in the following claims.

What is claimed is:
1. The combination of
(a) a talking doll having a speech unit contained therein, said speech unit being provided with a movable part disposed externally of the doll and adapted to be selectively moved relative to the doll to actuate the speech unit;
(b) a one-hand selectively operable remote control apparatus providing for actuation of the speech unit from a location remote from the doll, said remote control apparatus comprising a frame including
(I) support means releasably supporting and maintaining the doll in a generally seated position during the movement of the movable part to operate the speech unit and
(II) a selectively movable remote control element movably mounted on said frame and releasably engaging the selectively movable part of the speech unit on said doll to produce movement of that part relative to the doll so as to actuate the speech unit, said movable remote control element comprising an elongated part, handle means on the other end of said elongated part adapted to be grasped by the child-user and manipulated with one hand to cause movement of said movable part relative to the doll to thereby actuate the speech unit, said handle means and other end of said elongated part extending to a position relatively remote from the doll and in a direction to pull said doll firmly against said support means so that the speech unit of the talking doll may be actuated by the child-user with one hand and without being in close proximity to the doll itself.

2. A combination as stated in claim 1 wherein said speech unit includes a spring motor with an operating pull cord attached thereto and being selectively operable by pulling and then releasing said cord, said remote control apparatus including biasing counterbalance means connected between said frame and said movable elements to urge said movable element toward the doll to thereby counteract frictional forces on the movable element opposing the return of the movable part of the speech unit after it has been pulled away from the doll and then released.

3. The combination as stated in claim 1 wherein the movable part of the speech unit of the talking doll is in the form of a loop and said movable member is provided with hook means releasably engaging said loop.

4. A combination as stated in claim 1 wherein said remote control apparatus comprises a doll stroller apparatus for permitting the child-user to actuate the speech unit from a location remote from the doll itself and while the stroller apparatus is being moved, said stroller apparatus comprising: a frame having at least one horizontally extending wheeled axle, said support means comprising a seat disposed above said axle, and a push handle section disposed above said seat, said seat including a rear wall having an aperture therein and said movable part of the speech unit extending therethrough, said remote control means further comprising free rotating bearing means on said axle and said movable control element being disposed with said handle means supported for movement at said push handle section with said elongated part comprising a flexible strand extending intermediate its ends over said bearing means, whereby the child-user may pull on the handle means with one hand to converse with a doll while moving the stroller with the other hand and thereby tend to pull said doll firmly down on said seat.

5. A combination as stated in claim 4 wherein said aperture is in the form of a vertical slot whereby said support means is adapted to receive various sized dolls disposed in various positions in the frame seat.

6. The combination as stated in claim 1 wherein said remote control apparatus includes support means fixed thereto and adapted to be secured at one side of a table to position the doll in a generally seated position at said table and said elongated part is a flexible strand guided to extend under the table to position the handle means where it may be manipulated by the child-user positioned at the table remote from the place where the doll is seated, whereby the manipulation of the remote control means is not readily visible from a position at or above the table.

References Cited by the Examiner

UNITED STATES PATENTS

| | | | |
|---|---|---|---|
| 1,447,953 | 3/1923 | Herschmann | 46—98 |
| 1,488,626 | 4/1924 | Steiner | 46—98 |
| 2,480,996 | 9/1949 | Bocchino | 46—99 |
| 2,964,098 | 12/1960 | Towse | 297—134 X |
| 3,017,187 | 1/1962 | Ryan | 46—118 X |
| 3,052,500 | 9/1962 | Hyde | 297—130 |

RICHARD C. PINKHAM, *Primary Examiner.*